United States Patent
Chonan

(10) Patent No.: US 9,387,905 B2
(45) Date of Patent: Jul. 12, 2016

(54) SPROCKET FOR BICYCLE

(71) Applicant: SR SUNTOUR INC., Chang Hua (TW)

(72) Inventor: Yoshiya Chonan, Tsukuba (JP)

(73) Assignee: SR SUNTOUR INC., Fu Hsing Industrial Zone, Chang Hua (TW)

( * ) Notice: Subject to any disclaimer, the term of this patent is extended or adjusted under 35 U.S.C. 154(b) by 0 days.

(21) Appl. No.: 14/320,563

(22) Filed: Jun. 30, 2014

(65) Prior Publication Data

US 2015/0007689 A1  Jan. 8, 2015

(30) Foreign Application Priority Data

Jul. 5, 2013  (TW) .............................. 102124174 A

(51) Int. Cl.
  *B62M 3/16* (2006.01)
  *F16H 55/30* (2006.01)
  *B62M 3/00* (2006.01)

(52) U.S. Cl.
  CPC ................ *B62M 3/16* (2013.01); *B62M 3/003* (2013.01); *F16H 55/30* (2013.01); *Y10T 74/2165* (2015.01)

(58) Field of Classification Search
  CPC ....... B62M 3/00; B62M 3/003; B60B 27/023; B62K 19/34; Y10T 74/2164; Y10T 74/2165; F16B 39/282
  See application file for complete search history.

(56) References Cited

U.S. PATENT DOCUMENTS

| 1,235,530 | A | * | 7/1917 | Jones ............................ 384/458 |
| 3,578,829 | A | * | 5/1971 | Hata et al. ..................... 384/458 |
| 5,626,449 | A | * | 5/1997 | McKinlay ............. F16B 39/282 411/136 |

* cited by examiner

*Primary Examiner* — Thomas Diaz
(74) *Attorney, Agent, or Firm* — Bui Garcia-Zamor; Jessica H. Bui, Esq.

(57) ABSTRACT

In a sprocket for a bicycle having a radial bearing acting as a bearing portion, an axial load acting on the bearing can be easily adjusted without having to dismount the components of the bicycle after the bicycle has been assembled; a spring washer is used as a component for an anti-rotation mechanism of an adjusting nut which serves to adjust the axial load of the radial bearing, so that an excessive load is not applied on the radial bearing to avoid a defective rotation, and the axial load acting on the radial bearing can be easily adjusted without having to dismount the components of the bicycle even after the bicycle has been assembled.

2 Claims, 3 Drawing Sheets partly enlarged view

SPROCKET FOR BICYCLE

BACKGROUND OF THE INVENTION

1. Field of the Invention

The present invention relates to a sprocket for a bicycle.

2. Description of the Related Art

Recently, a sprocket having a radial bearing is widely used for the reason that adopting the radial bearing can enhance the precision of the bearing portion and make it superior in durability.

However, once the relative position between the inner race and the outer race of the radial bearing in an axial direction has a deviation, it will cause a defective rotation. As a certain amount of load may effect a deviation in the relative position between the inner race and the outer race in an axial direction, and result in a defective rotation, a load like that should be avoided. However, it is necessary to preload a certain amount of load with which swing is not felt in the least, even though a rider pedals a bicycle.

In a prior example as shown in FIG. 3, a left crank is mounted on a shaft with two fixing bolts disposed in the direction perpendicular to the shaft loosely. First, temporarily fixing bolts disposed in the axial direction of the shaft are fastened not to cause the crank to make a defective rotation and an axial swing. Next, the two fixing bolts disposed in the direction perpendicular to the shaft are fastened with equal forces, so that an axial force will not be generated with the left crank locked on the shaft. If the fastening forces of the two bolts are not equal, the two bolts and the left crank may be gradually loosening in use. Therefore, a beginner is required to perform a hard operation, due to the fact that it can be not adjusted after the left crank has been mounted.

In another prior example as shown in FIG. 4, fixing bolts disposed in a direction perpendicular to a shaft are fastened, such that a left crank can not be loosened any more even though a rider pedals a bicycle continuously for a long time. The left crank is secured through a friction to a shaft, or is secured at a locking position to a locking portion provided. At this time, an axial force is not applied to a bearing by the left crank, directly, but indirectly through an elastomer therebetween. As the force is blocked by the elastomer, it can be set without rendering a defective rotation and an axial swing. However, with the elastomer therebetween, when a large force is applied from the left crank side toward a right crank, the shaft will move temporarily toward the right crank to cause an adverse effect on a driving system. Hence, it can be not adjusted after the left crank has been mounted.

In a still further prior example as shown in FIG. 5, a shaft inserted into a left crank and secured therein passes through a sleeve 3, a left bearing and a right bearing, and then extends into a right crank. An adjusting nut is fastened to a screw thread portion matching with the adjusting nut without causing the shaft to swing. The screw thread portion for the adjusting nut is disposed at a base portion of the shaft for securing the right crank. Next, the portion for securing the right crank which is outside the adjusting nut, is inserted into the right crank, and then, fixing bolts, which are disposed in the direction perpendicular to the shaft are fastened, such that the right crank will not be loosened any more even though a rider pedals a bicycle continuously for a long time. At this time, the right crank abuts the end face of the adjusting nut. An axial force is applied to the adjusting nut by the right crank. Since a sleeve 1 and a sleeve 2 are disposed between the outer races and the inner races of the right and left radial bearings and the relative position of the outer races and the inner races forming the bearings remains unchanged, the force applied to the bearings will not cause the bearings to render a defective rotation. Because the right crank abuts the end face of the adjusting nut, the adjusting nut can not be loosened to change the adjustment. However, this method can not make an adjustment after mounting, either.

SUMMARY OF THE INVENTION

A sprocket for a bicycle is provided in which a radial bearing is used to act as a bearing portion and in which an axial load on the bearing can be easily adjusted without dismounting the components of the bicycle, even after the bicycle has been assembled.

After a shaft is mounted in a radial bearing, an adjusting nut for adjusting axial load is disposed on the shaft. Next, an anti-rotation mechanism provided with a spring washer is disposed, such that the adjusting nut will not be loosened or tightened up automatically when running a bicycle. Furthermore, when a left crank is combined with the spring washer, no excessive load is to be applied to the radial bearing. With the anti-rotation mechanism having the spring washer, even though the sprocket is mounted, an axial load on the radial bearing can be easily adjusted without dismounting.

DESCRIPTION OF THE PREFERRED EMBODIMENTS

Figure 1:
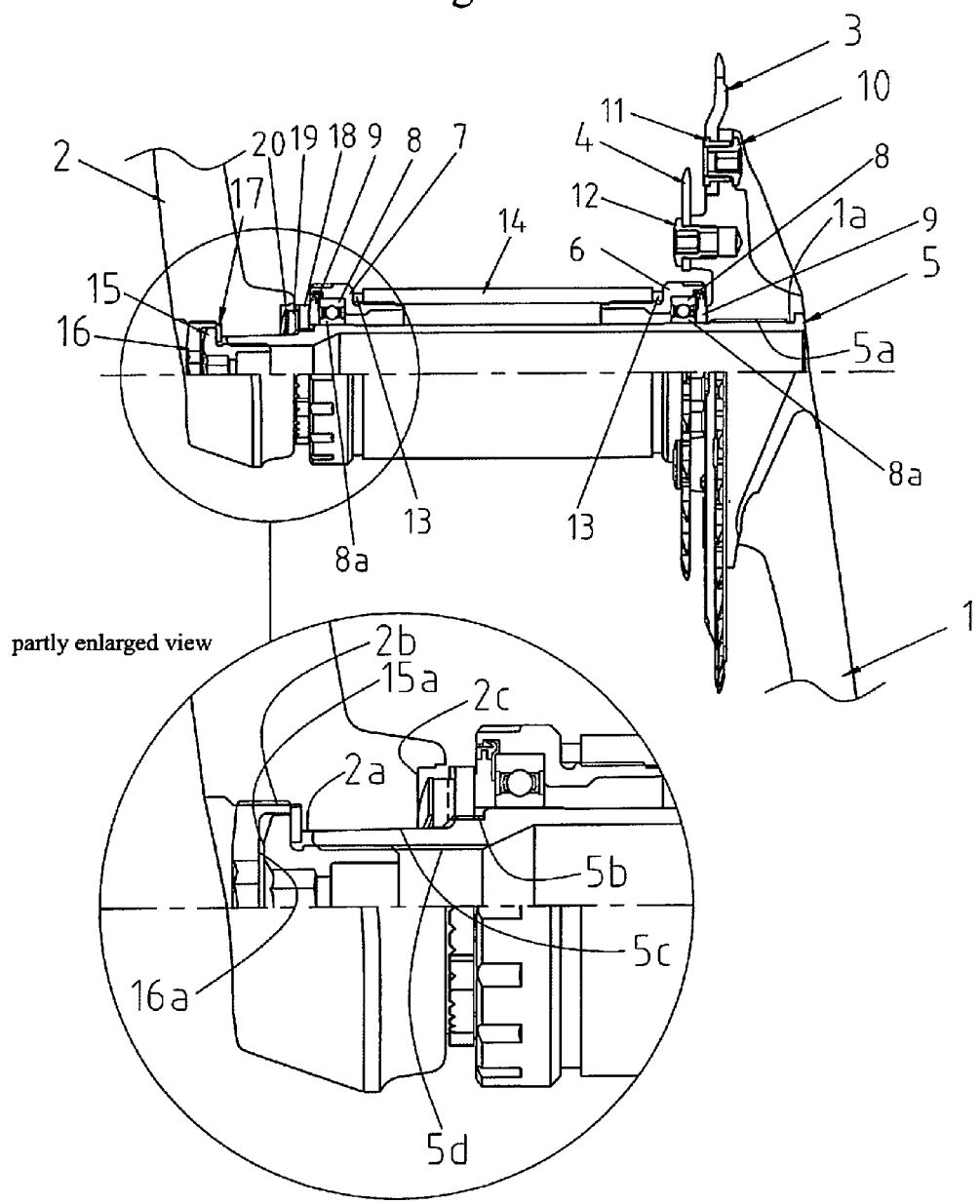
FIG. 1 shows a preferred embodiment for the present invention.

A shaft 5, which has already been put into a right crank 1 and secured therein, is inserted from a radial bearing at the right side of a bicycle and protrudes from another radial bearing at the left side of the bicycle. Further, an adjusting nut 18 is fastened to a thread portion of a screw in a way of not causing a defective rotation and an axial swing. The thread portion of screw is disposed at a base portion of a region for determining the angle of a left crank 2 and press-fitting the left crank 2. As described later, the rotation of the adjusting nut 18 is restrained by a lock washer 19, provided with a plurality of serrations 51 opposite to the adjusting nut 18.

Next, the lock washer 19 having a hole slightly larger than a profile of a portion of the shaft 5 for restraining rotation with respect to the left crank 2 and press-fitting the shaft 5 and is secured around the shaft 5 with a plurality of serrations 52 facing the right crank side.

The lock washer 19 is restrained from rotating based on the shape of the shaft 5. When the serrations 51 of the adjusting nut 18 and the serrations 52 of the lock washer 19 face to and are engaged with each other, the adjusting nut 18 is restrained from rotating indirectly due to a friction induced from the serrations 51, 52. Here, the friction can be obtained from the serrations 51, 52, but the way to obtain the friction is not limited to the serrations 51, 52.

Figure 2:
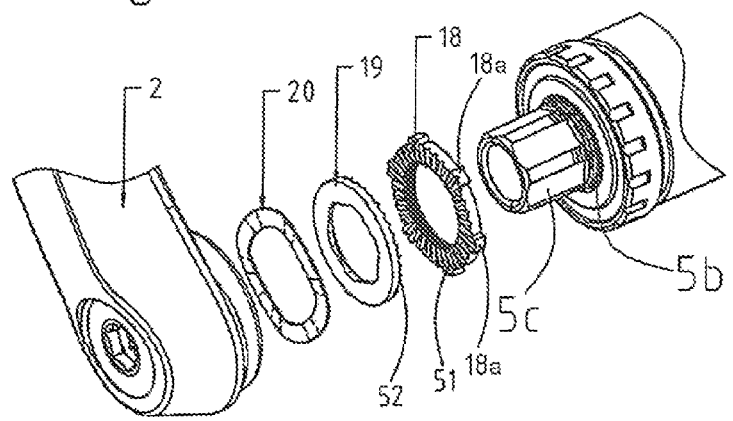
FIG. 2 is an exploded perspective view of the left part of the embodiment of FIG. 1.

Subsequently, a spring washer 20 is mounted on the shaft. In FIG. 2, a wave spring washer 20 is shown, but it is not limited to this. The adjusting nut 18, the lock washer 19, and the spring washer 20 are arranged in this order (referring to FIG. 2).

Next, the left crank 2 is mounted on the shaft 5 and is secured by a fixing bolt 15. As such, the left crank 2 makes the spring washer 20 compressed and deformed to generate an axial force. With this axial force, the lock washer 19 is pushed toward the adjusting nut 18 to enhance a lock effect of the lock washer 19. For the embodiment using the radial bearing, the reason why the adjusting nut 18 is sometimes loosened and sometimes tightened up is due to vibration or twist. Basically, a turning force can not be generated to render the adjusting nut 18 sometimes loosened and sometimes tightened up. Therefore, a force for making the spring washer 20 compressed and deformed is previously set in order not to cause the radial bearing a defective rotation.

When riding the bicycle, the right crank 1, the shaft 5, a right dust cover 9, the inner race of the right bearing, the inner race of the left bearing, a left dust cover, the lock washer 19, the adjusting nut 18, the spring washer 20, the left crank 2, etc are rotated together, that is to say not only the adjusting nut 18 is naturally rotated. However, the adjusting nut 18 is pressed by the spring washer 20 with the lock washer 19 located therebetween. Therefore, in the case of securing the crank, only the adjusting nut 18 is loosened or tightened up, with an effect that an axial load on the bearing can be adjusted without disassembling of the sprocket, and, with the serrations 51, 52, a fine axial load can be easily adjusted.

Figure 3:
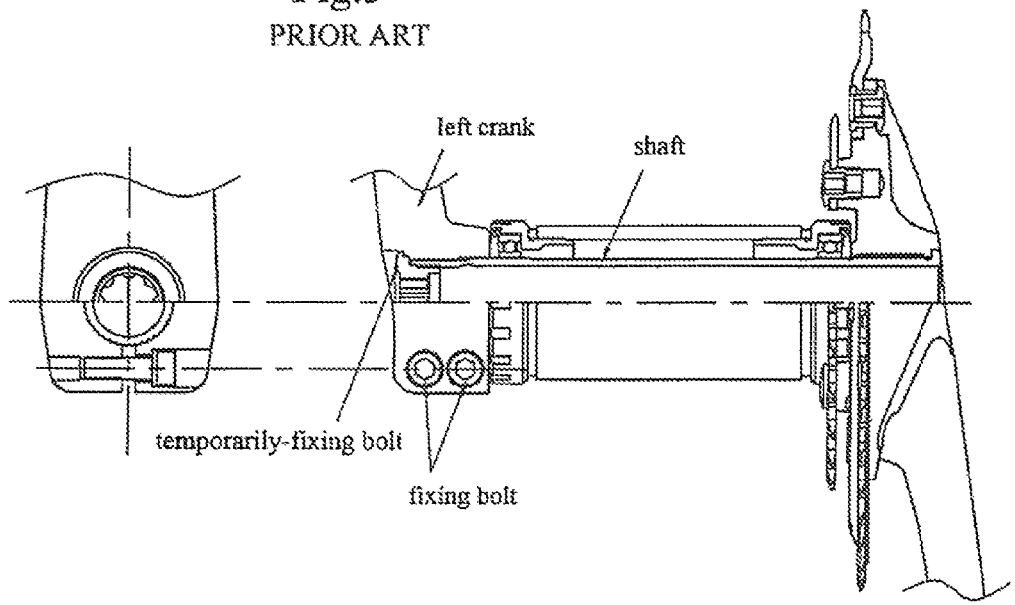
FIG. 3 shows a first embodiment of the prior art.
Figure 4:
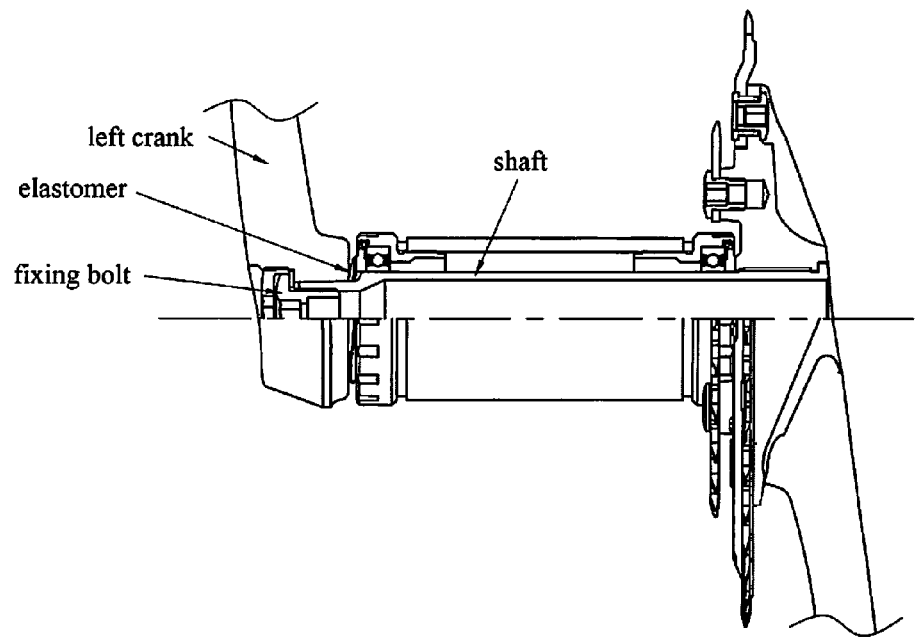
FIG. 4 shows a second embodiment of the prior art.
Figure 5:
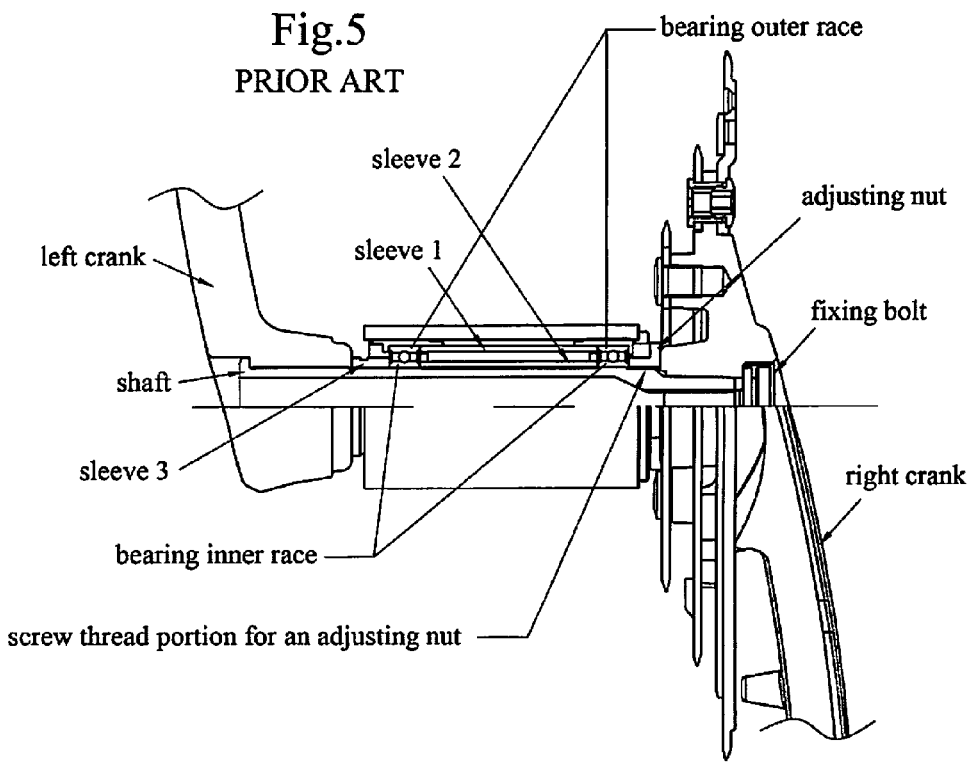
FIG. 5 shows a third embodiment of the prior art.

Hereinafter, an embodiment of the present invention will be described with reference to the drawings. FIG. 1 shows an embodiment of the present invention. FIG. 2 is an exploded perspective view of the left part of the embodiment as shown in FIG. 1 of the present invention. FIGS. 3 and 4 show three types of prior art embodiments respectively.

According to the present invention, as shown in FIG. 1 on a shaft 5, there are disposed key slots 5a for restraining rotation with respect to a right crank 1 and for press-fitting fixation; a thread portion 5b of screw, on which an adjusting nut 18 having a plurality of serrations 51 can be screwed; a portion 5c for restraining the rotation with respect to a left crank 2 and for press-fit mounting; and a thread portion 5d of screw, on which a fixing bolt 15 can be screwed to secure the left crank 2.

Key slots 1a for restraining the rotation of the right crank 1 with respect to the shaft 5 and for press-fitting fixation are disposed on the right crank 1. The key slots 5a of the shaft 5 are engaged with the key slots 1a to make the right crank 1 and the shaft 5 integrated together. Then, large gears 3 and small gears 4 are fixed by using bolts 10, bolts 12 and nuts 11. A gear ratio can be selected so that a chain can be derailed onto a selected gear.

A deformation hole 2a and a thread portion 2b of screw for restraining rotation of the left crank 2 with respective to the shaft 5 and for press-fitting fixation are disposed on the left crank 2. A cap bolt 16 can be fastened on the thread portion 2b of screw. The cap bolt 16 can be designed to make the sprocket assembled/disassembled by merely using a hex wrench. After a washer 17 and the fixing bolt 15 put inside the thread portion 2b of screw, the cap bolt 16 is fastened. When the fixing bolt 15 is loosened to dismount the left crank 2, the head 15a of the fixing bolt 15 touches the inner side 16a of the cap bolt 16, and hence the left crank 2 comes out gradually. On the left crank 2, there is a side face 2c abutting a spring washer 20.

On the right side of a bottom bracket shell 14, there are mounted a right bowl 6 and a spacer 13 in which a bearing 8 and a dust cover 9 are fitted inside the bowl 6, and the spacer 13 is corresponding to a portion of the bottom bracket shell 14 having a different width. Additionally, the dust cover 9 only abuts the inner race 8a of the bearing 8.

On the left side of the bottom bracket shell 14, there are mounted a left bowl 7 and a spacer 13, in which a bearing 8 and a dust cover 9 are fitted inside the bowl 7, and the spacer 13 is corresponding to a portion of the bottom bracket shell 14 having a different width. Additionally, the dust cover 9 only abuts the inner race 8a of the bearing 8.

The shaft 5 is first put into the right crank 1 and secured therein, and then is inserted into the above-assembled bottom bracket. The adjusting nut 18 having a plurality of serrations 51 facing the left crank side is fastened onto the thread portion 5b at the front end of the shaft 5 without causing a defective rotation and an axial swing, thereby the right crank 1 is mounted on the bottom bracket.

The lock washer 19 having a plurality of serrations 52 is disposed adjacent to the adjusting nut 18 with the serrations 52 facing the right crank 1, so that the serrations 52 engage with the serrations 51 of the adjusting nut 18. The lock washer 19 is mounted on the shaft 5 and is restrained from rotating by the shaft 5.

The spring washer 20 is disposed adjacent to the lock washer 19.

By means of the fixing bolt 15 being screwed with a screw thread 5d at the central portion of the shaft 5, the left crank 2 is mounted outside the spring washer 20 with the rotation of the left crank 2 restrained by the portion 5c of the shaft 5.

A fixing bolt 15 is inserted into the threaded portion 5d of the shaft 5 located at the central portion, so as to urge the left crank 2 to abut the spring washer 20. The left crank 2 is restricted from rotating by the portion 5c of shaft 5.

The side face 2C of the left crank 2 which faces the right crank is arranged to axially press against the spring washer 20, which renders the lock washer 19 to urge against the adjusting nut 18. A friction resistance generated by the engagement of the serrations 51 of the adjusting nut 18 with the opposite serrations 52 of the lock washer 19 ensures that the adjusting nut 18 is not loosened and or tightened occasionally. With the spring washer 20 provided between the left crank 2 and the bearing 8, an excessive load will not be applied to the bearing, and hence a defective rotation is avoided.

As shown in the drawings, the lock washer 19 is located between the adjusting nut 18 and the spring washer 20. As such, the adjusting nut 18 is pressed by the spring washer 20 with the lock washer 18 isolated in between. The adjusting nut 18 is provided with a number of projections 18a along its circumference. A special adjusting tool (not shown) can act on the projections 18a to rotate/turn the adjusting nut 18 in either directions to adjust the axial load applied on the bearing to the condition desired. Hence, under the condition that the crank is secured, a special adjusting tool (not shown) can act on the projections 18a to rotate/turn the adjusting nut 18 in either directions to adjust the axial load applied on the bearing 8 to the condition desired.

Although, the shaft 5 is secured in the right crank 1, as shown in the present embodiment, yet the shaft 5 can be secured in the left crank 2, too. The sprocket has two gears as shown in the present invention, but a sprocket having one gear or three gears is applicable, too.

In existing sprocket provided with a radial bearing to avoid an excessive load from acting on the bearing in an axial direction, which may lead to a defective rotation, a left crank having a cut-out is secured by fastening a bolt in a direction perpendicular to the shaft. However, the provision of the cut-out will degrade the strength of the left crank. Therefore, the wall of the left crank has to be thickened for strength, which will result in the increase of the weight of the left crank, and the axial load can not be adjusted after the assembly is made.

Also, in order to minimize the left crank, a portion for the insertion of a bolt is provided on the left crank in an axial direction and a bolt is provided to secure the left crank to the shaft. To prevent an excessive load generated in the axial direction from applying on the radial bearing, a spring washer 20 is provided. However, when a large force is applied in the axial direction, the spring washer is compressed, which will result in an axial displacement of the shaft, and impose an adverse effect on the driving system. After continuous use for a long period of time, the spring washer 20 will be deformed, and an axial swing results.

The present invention is intended to overcome the above problems of the prior art. In order to minimize a left crank, a portion for the insertion of a bolt is provided on the left crank in an axial direction, and a bolt is provided to secure the left crank to the shaft. As a spring washer 20 is provided therebetween, an excessive load will not be applied on the radial bearing. Even if a large force is applied in the axial direction, it acts on the adjusting nut, instead of the spring washer 20. As the shaft will not move in the axial direction, no adverse effect is imposed on the driving system. For the prior art embodiments, after an assembly is made, no adjustment can be made. Even if the assembly is not adjusted to the best condition, a user has to endure it. To the contrary, in the present invention, an adjustment can still be made even after assembly. Therefore, the present invention is advantageous to the users.

What is claimed is:

1. A sprocket for a bicycle, comprising:
a radial bearing acting as a bearing portion;
a shaft adapted to be inserted into a right crank and secured therein, the shaft including a threaded portion at one end, and a receiving portion projecting from the threaded portion;
a left crank fixedly mounted on the receiving portion of the shaft, and having a side at which mounting and dismounting of the left crank are performed;
an adjusting nut disposed on the threaded portion of the shaft for applying an appropriate axial force on the radial bearing, the adjusting nut having a first plurality of serrations at a surface thereof;
a lock washer arranged to urge against the adjusting nut, and having a second plurality of serrations at one surface facing the surface of the adjusting nut provided with the first plurality of serrations, the second plurality of serrations of lock washer mesh with the first plurality of serrations of the adjusting nut so as to prevent the adjusting nut from loosening, wherein the lock washer non-rotatably engages with the receiving portion projecting from the threaded portion; and
a spring washer arranged to urge against the other surface of the lock washer that is free of the serrations, the spring washer being configured to enhance a locking function of the lock washer, and to prevent an excessive force from being applied on the radial bearing during the mounting of the left crank, which would result in a defective rotation,
wherein, when the left crank is secured, the axial load of the bearing is adjustable by turning the adjusting nut, without having to dismount the sprocket after assembly.

2. A sprocket for a bicycle, comprising:
a radial bearing acting as a bearing portion;
a shaft including a threaded portion at one end and a receiving portion projecting from the threaded portion, mounted in the radial bearing and positioned between a right crank and a left crank, the left crank being fixedly mounted on the receiving portion of the shaft and having a side at which mounting and dismounting of the left crank are performed;
an adjusting nut disposed on the threaded portion of the shaft to adjust an axial force on the radial bearing, the adjusting nut having a first plurality of serrations at a surface thereof;
a lock washer disposed on the shaft and arranged to urge against the adjusting nut, the lock washer having a second plurality of serrations at one surface facing the surface of the adjusting nut provided with the first plurality of serrations, the second plurality of serrations of lock washer mesh with the first plurality of serrations of the adjusting nut for so as to prevent preventing the adjusting nut from loosening;
a spring washer disposed on the shaft and arranged to urge against the other surface of the lock washer that is free of the serrations, the spring washer being configured to enhance a locking function of the lock washer, and to prevent an excessive force from being applied on the radial bearing during the mounting of the left crank, and to enhance a locking function of the lock washer,
wherein, when the left crank is secured, the axial force of the bearing and, in turn, the rotation torque of the sprocket is adjustable by turning the adjusting nut, without having to dismount the sprocket after assembly.

* * * * *